(12) United States Patent
McGovern et al.

(10) Patent No.: US 6,619,712 B1
(45) Date of Patent: Sep. 16, 2003

(54) REFUELING MAST RETAINING TOOL FOR A NUCLEAR REACTOR

(75) Inventors: Thomas Harold McGovern, Exton, PA (US); Leland L. Lantz, Wayne, PA (US)

(73) Assignee: General Electric Company, Schenectady, NY (US)

(*) Notice: Subject to any disclaimer, the term of this patent is extended or adjusted under 35 U.S.C. 154(b) by 325 days.

(21) Appl. No.: 09/655,531

(22) Filed: Sep. 5, 2000

(51) Int. Cl.[7] ............................................. G21C 19/10
(52) U.S. Cl. .................... 294/86.4; 294/67.3; 294/906; 376/268
(58) Field of Search ................ 294/67.1, 67.3, 294/86.4, 81.5, 92, 906; 376/261, 264, 268–271, 260

(56) References Cited

U.S. PATENT DOCUMENTS

| | | | | |
|---|---|---|---|---|
| 655,909 A | * | 8/1900 | Nebel et al. ............... | 254/31 |
| 894,923 A | * | 8/1908 | Vicksell .................... | 188/67 |
| 3,028,186 A | * | 4/1962 | Skubic ...................... | 294/68.3 |
| 3,421,635 A | * | 1/1969 | Bunger ...................... | 376/271 |
| 3,817,398 A | * | 6/1974 | Jones ........................ | 212/98 |
| 3,917,335 A | * | 11/1975 | Jones ........................ | 294/906 |
| 4,586,744 A | * | 5/1986 | Price ......................... | 294/92 |
| 4,894,849 A | | 1/1990 | Rohosky et al. | |
| 5,084,231 A | | 1/1992 | Dixon et al. | |
| 5,369,676 A | | 11/1994 | Ortega et al. | |
| 5,624,047 A | | 4/1997 | Challberg et al. | |
| 5,687,207 A | | 11/1997 | Meuschke et al. | |

* cited by examiner

Primary Examiner—Dean J. Kramer
(74) Attorney, Agent, or Firm—Armstrong Teasdale LLP

(57) ABSTRACT

A retaining tool for a telescoping refueling arm in a nuclear reactor, the retaining tool includes a plurality of support members coupled to a plurality of plates. The retaining tool includes a first plate having a first and a second side, a second plate spaced apart from the first plate, and a third plate having a first and a second side The third plate is spaced apart from the second plate so that the second plate is located between the first and third plates. The second side of the first plate engages the roller housings of the mast outer tube assembly, and the first side of the third plate engages the roller housings of one of the intermediate tube assembly to prevent the intermediate tube from extending and thus permitting the inner tube of the mast to fully extend.

13 Claims, 4 Drawing Sheets under 10 US 6,619,712 B1

REFUELING MAST RETAINING TOOL FOR A NUCLEAR REACTOR

BACKGROUND OF THE INVENTION

This invention relates generally to nuclear reactors, and, more particularly, to a retaining tool for a reactor refueling mast.

A boiling water reactor (BWR) includes a reactor core submerged in water in a closed reactor pressure vessel (RPV). The RPV is disposed in a containment vessel above which is disposed a refueling pool of water. During a refueling cycle, the upper head of the pressure vessel is removed along with internal components of the RPV to provide access to the reactor core. Water completely fills the open vessel up to the level of the pool disposed above, and a conventional mobile refueling gantry or platform is movable above the pool for carrying replacement fuel bundles to the reactor core and removing fuel bundles from the reactor core. The platform typically travels longitudinally on rails and has a trolley which moves transversely between the rails. A telescoping mast with a grapple at the bottom end is carried by the trolley so that fuel bundles may be accurately moved underwater to and from the reactor core.

The telescoping mast includes a plurality of nested tubes. An outer tube is fixed and the nested inner tubes extend downward from and retract into the outer tube. Each nested tube is smaller in diameter than the preceding tube. Because of the telescoping design, the smaller mast sections cannot begin to extend until the larger mast section above it reaches full extension.

Prior to use in the reactor, the mast and grapple are tested for operation in the fuel storage pool. The grapple jaws are tested using a dummy fuel bundle. The mast is slowly extended to the bottom of the fuel storage pool and checked for binding. However, due to the low depth of the fuel storage pool, the mast cannot reach full extension. In order to fully test the mast, some methods were tried, unsuccessfully, to hold the larger sections from extending to permit the smaller sections to extend. One method tried was to wedge the upper sections together to prevent extension. Another method tried was to tie the upper section to an object such as a handrail with a rope.

It is desirable to provide an apparatus that would permit the extension of the smaller sections of the mast in the fuel storage pool to fully test the mast before the refueling operation is started.

BRIEF SUMMARY OF THE INVENTION

A retaining tool for a telescoping refueling arm in a nuclear reactor permits fully testing the mast before the refueling operation of the reactor is started. The refueling arm includes an outer tube assembly, a plurality of intermediate tube assemblies, and an inner tube assembly. Each of the outer tube assembly and the intermediate tube assemblies includes, at a bottom end, a flange and a plurality of roller housings spaced around the circumference of each flange. In an exemplary embodiment, the retaining tool includes a plurality of support members coupled to a plurality of plates. The retaining tool includes a first plate having a first and a second side, a second plate spaced apart from the first plate, and a third plate having a first and a second side The third plate is spaced apart from the second plate so that the second plate is located between the first and third plates. The second side of the first plate engages the roller housings of the mast outer tube assembly, and the first side of the third plate engages the roller housings of one of the intermediate tube assembly.

The above described retaining tool permits the extension of the smaller sections (the inner and one of the intermediate tube assemblies) of the mast in the fuel storage pool to fully test the mast before the refueling operation of the reactor is started.

DETAILED DESCRIPTION OF THE INVENTION

Figure 1:
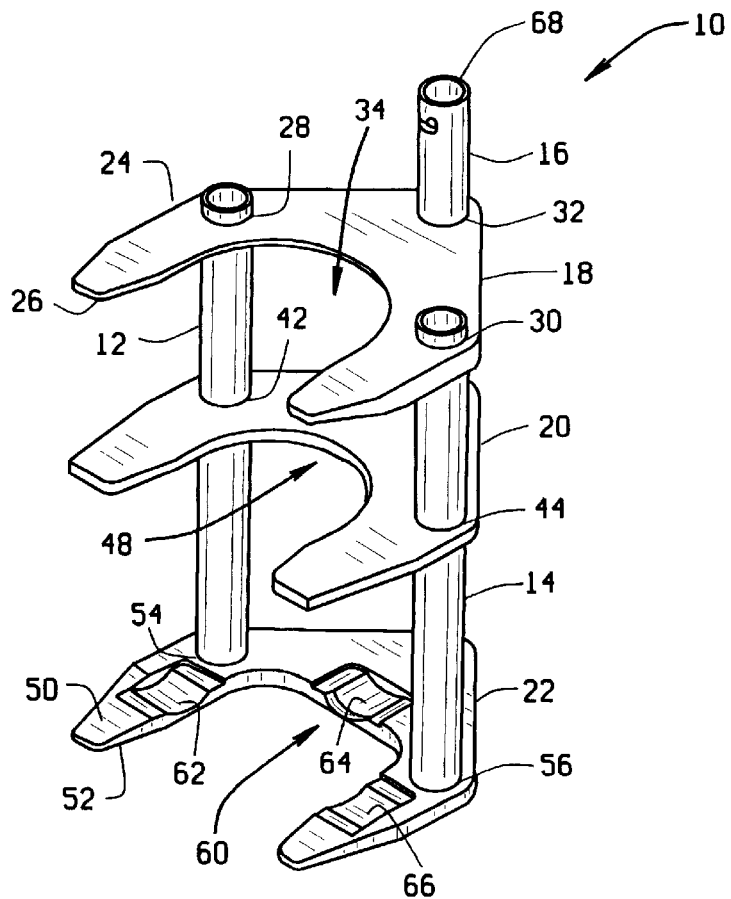
FIG. 1 is a perspective view of a retaining tool in accordance with an embodiment of the present invention.
Figure 2:
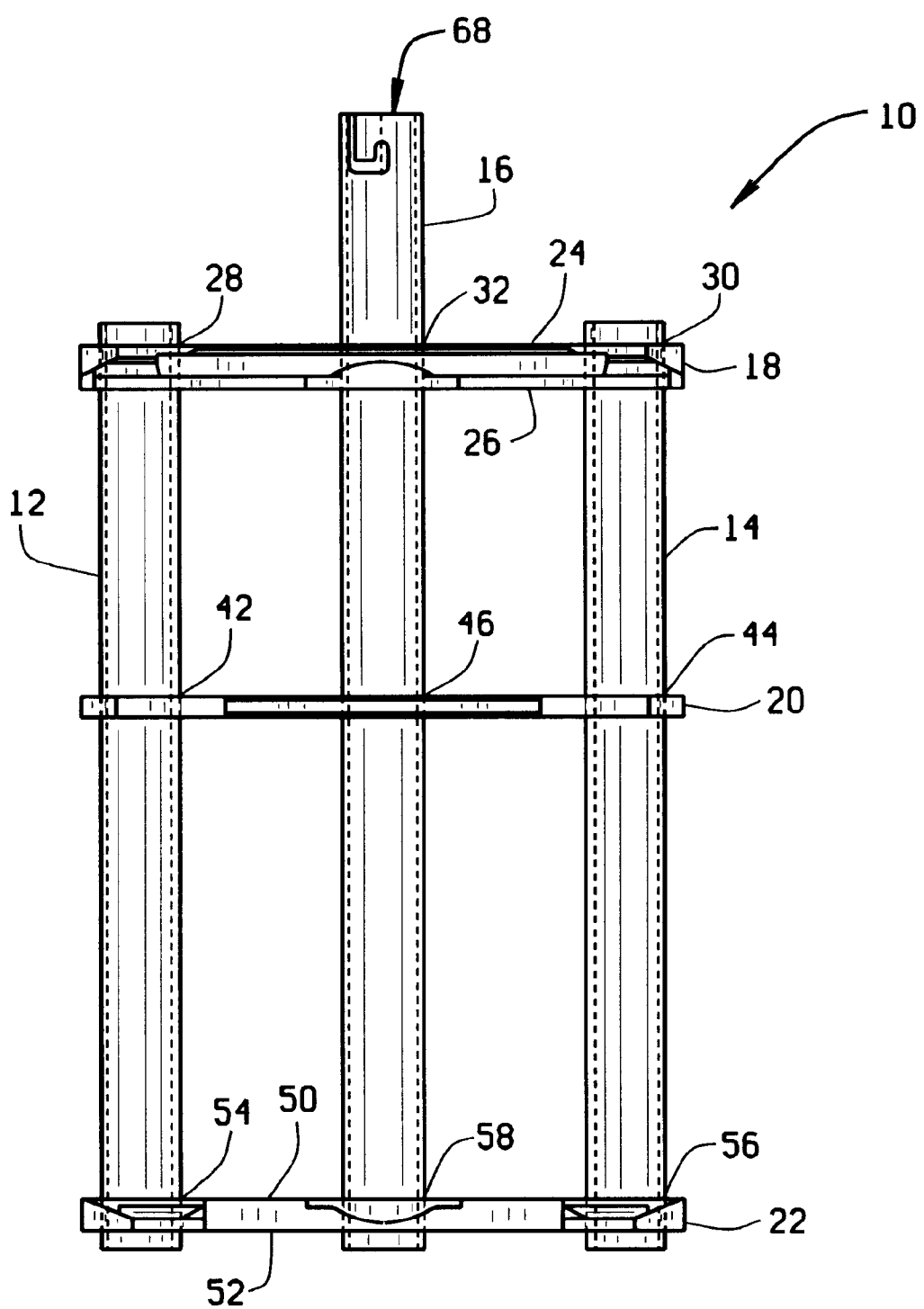
FIG. 2 is a front view of the retaining tool shown in FIG. 1.

FIG. 1 is a perspective view of a retaining tool 10 in accordance with an embodiment of the present invention, and FIG. 2 is a front view of retaining tool 10. Referring to FIGS. 1 and 2, retaining tool 10 includes first, second, and third support members 12, 14, and 16 coupled to first, second, and third plates 18, 20, and 22. Plates 18, 20, and 22 are spaced apart from each other and arranged so that second plate 20 is positioned between first plate 18 and third plate 22. Each support member 12, 14, and 16 extends through, and is coupled to, each plate 18, 20, and 22, for example, by welding. Support members 12, 14, and 16 are cylindrical tubes. In alternative embodiments, support members can be any shape, for example, rectangular channel, solid rods, and the like.

Figure 3:
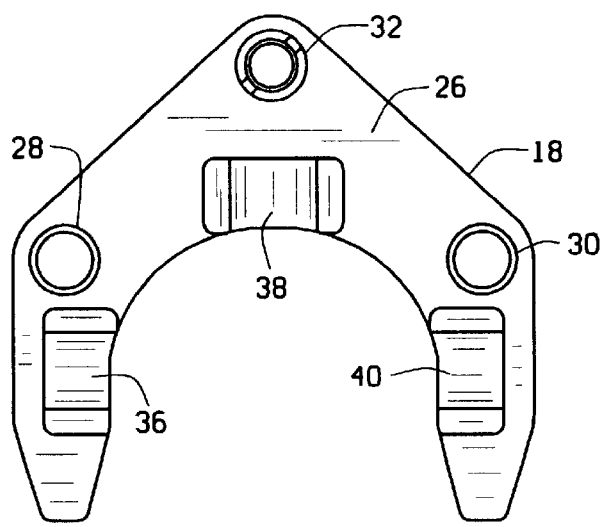
FIG. 3 is a bottom view of the first plate of the retaining tool shown in FIG. 1.

First plate 18 includes first and second sides 24 and 26, and openings 28, 30, and 32 sized to receive support members 12, 14, and 16 respectively. Plate 18 also includes an arcuate cut out 34 sized to conform to a tube assembly of a refueling mast. Referring to FIG. 3, second side 26 of plate 18 includes first, second, and third pockets, or seats, 36, 38, and 40 machined into second side 26.

Referring again to FIGS. 1 and 2, second plate 20 includes openings 42, 44, and 46 sized to receive support members 12, 14, and 16 respectively. Plate 20 also includes an arcuate cut out 48 sized to conform to a tube assembly of a refueling mast.

Third plate 22 includes first and second sides 50 and 52, and openings 54, 56, and 58 sized to receive support members 12, 14, and 16 respectively. Plate 22 also includes an cut out 60 sized to receive a tube assembly of a refueling mast. First side 50 of plate 22 includes first, second, and third pockets, or seats, 62, 64, and 66 machined into first side 50.

Third support member 16 extends beyond first side 24 of first plate 18 and includes a handing pole interface 68.

Plates 18, 20, and 22, and support members 12, 14, and 16 can be fabricated from any suitable material, for example, aluminum alloys, stainless steel alloys, and the like. In an exemplary embodiment, plates 18, 20, and 22, and support members 12, 14, and 16 are fabricated from aluminum alloy 6061-T6. Aluminum alloy 6061-T6 provides a high strength-to-weight ratio, and good corrosion resistance in an underwater environment.

Figure 4:
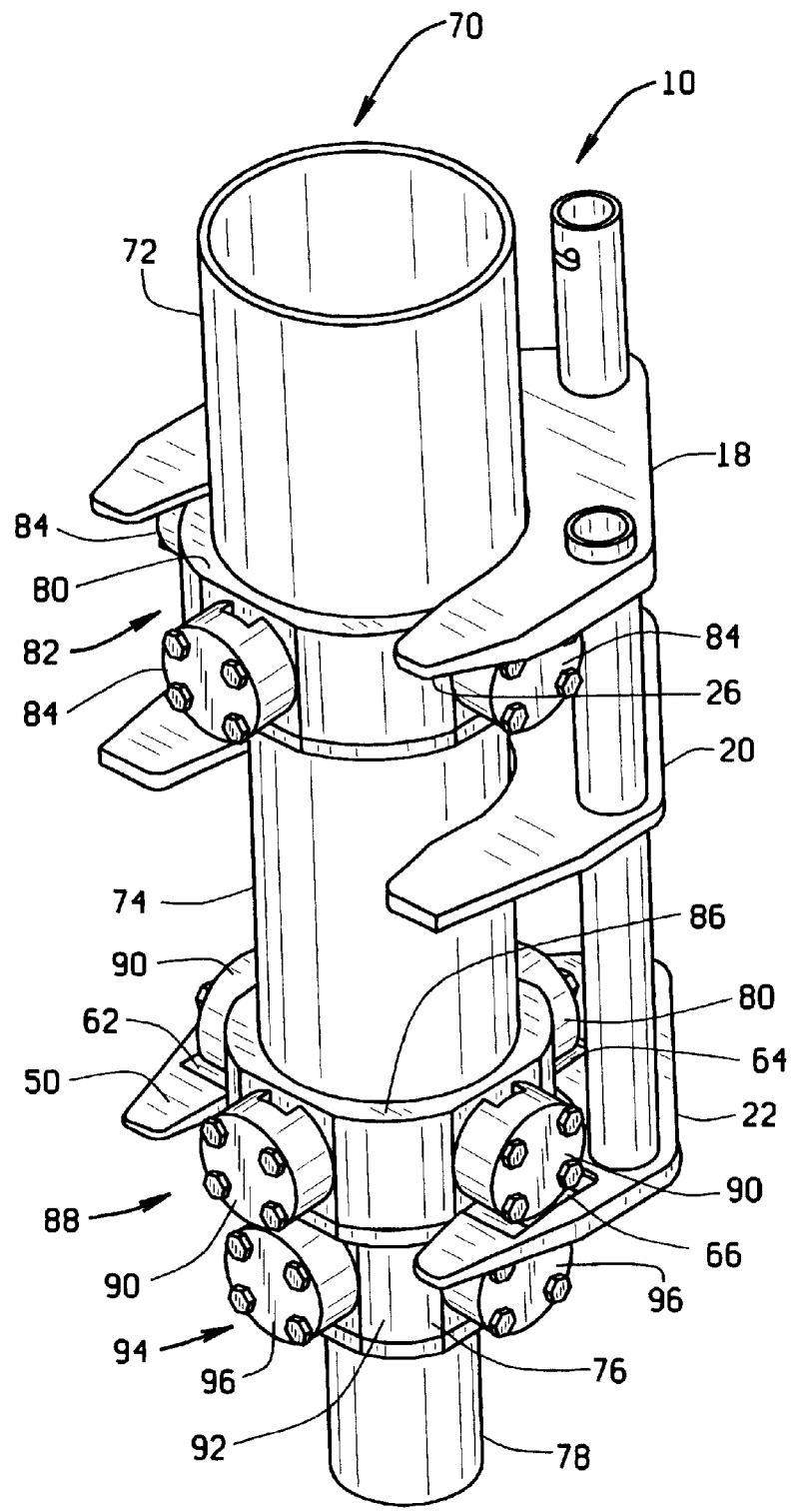
FIG. 4 is a perspective view of the retaining tool shown in FIG. 1 attached to the outer tube assembly and first intermediate tube assembly of a telescoping refueling mast.

FIG. 4 is a perspective view of retaining tool 10 attached to a telescoping refueling mast 70. Mast 70 includes four telescoping tube assemblies, an outer tube assembly 72, a first intermediate tube assembly 74, a second intermediate tube assembly 76, and an inner tube assembly 78. Telescoping tube assemblies 72, 74, 76, and 78 are nested inside each other and slide relative to each other. Particularly, first intermediate tube assembly 74 slides within outer tube assembly 72, second intermediate tube assembly 76 slides within first intermediate tube assembly 74, and inner tube assembly 78 slides within second intermediate tube assembly 76.

Outer tube assembly 72 includes a flange 80 at a first end 82. Four roller housings 84 (three shown) are attached to flange 80 and are spaced circumferentially around outer tube assembly 72. Roller housings 84 house roller assemblies (not shown) that guide first intermediate tube assembly 74 as it slides within outer tube assembly 72.

First intermediate tube assembly 74 includes a flange 86 at a first end 88. Four roller housings 90 are attached to flange 86 and are spaced circumferentially around first intermediate tube assembly 74. Roller housings 90 house roller assemblies (not shown) that guide second intermediate tube assembly 76 as it slides within first intermediate tube assembly 74.

Second intermediate tube assembly 76 includes a flange 92 at a first end 94. Four roller housings 96 (two shown) are attached to flange 92 and are spaced circumferentially around second intermediate tube assembly 76. Roller housings 96 house roller assemblies (not shown) that guide inner tube assembly 78 as it slides within second intermediate tube assembly 76.

In one exemplary embodiment, telescoping tube assemblies 72, 74, 76, and 78 have diameters of about 6 inches, 5 inches, 4 inches, and 3 inches respectively, with a wall thickness of about 0.25 inch. Of course, in alternative embodiments telescoping tube assemblies 72, 74, 76, and 78 can have other suitable diameters and wall thickness.

Mast retaining tool 10 is positioned on mast 70 so that second side 26 of first plate 18 engages roller housings 84 of outer tube assembly 72, and first side 50 of third plate 22 engages roller housings 90 of first intermediate tube assembly 74. Particularly, pockets, or seats, 36, 38, and 40 are machined to conform to roller housings 84, and pockets, or seats, 62, 64, and 66 are machined to conform to roller housings 90 to permit retaining tool 10 to lock onto mast 70.

Retaining tool 10 is installed on mast 70 when mast 70 is in a retracted position. When mast 70 is activated to extend first and third plates 18 and 22 engage roller housings 84 and 90 respectively and transfer a load to tool 10. This load and the shape of pockets 36, 38, 40, 62, 64, and 66 locks retaining tool 10 onto mast 70 and prevents first intermediate tube assembly 74 from extending. Second intermediate tube assembly 76 and inner tube assembly 78 can fully extend for inspection and testing.

Figure 5:
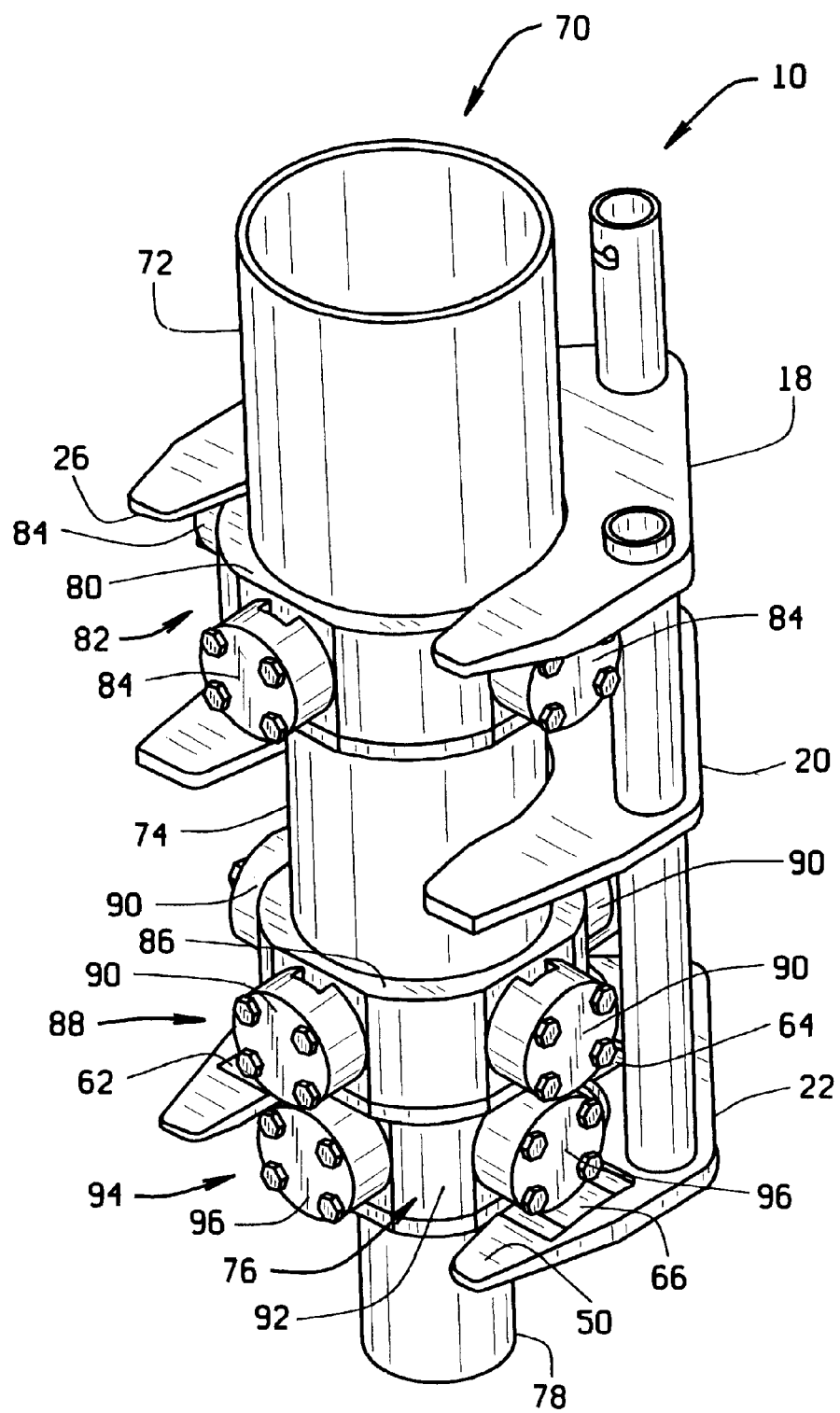
FIG. 5 is a perspective view of the retaining tool shown in FIG. 1 attached to the outer tube assembly and second intermediate tube assembly of a telescoping refueling mast.

FIG. 5 is a perspective view of retaining tool 10 attached to telescoping refueling mast 70 so that first and second intermediate tube assemblies 74 and 76 are restrained from extending. Particularly, mast retaining tool 10 is positioned on mast 70 so that second side 26 of first plate 18 engages roller housings 84 of outer tube assembly 72, and first side 50 of third plate 22 engages roller housings 96 of second intermediate tube assembly 76. Pockets, or seats, 62, 64, and 66 conform to roller housings 96 to permit retaining tool 10 to lock onto mast 70.

Retaining tool 10 is installed on mast 70 when mast 70 is in a retracted position. When mast 70 is activated to extend first and third plates 18 and 22 engage roller housings 84 and 96 respectively and transfer a load to tool 10. This load and the shape of pockets 36, 38, 40, 62, 64, and 66 locks retaining tool 10 onto mast 70 and prevents first intermediate tube assembly 74 and second intermediate tube assembly 76 from extending. With tool 10 in this position, only inner tube assembly 78 can fully extend for inspection and testing.

The above described retaining tool 10 permits full extension of second intermediate tube assembly 76 and/or inner tube assembly 78 of mast 70 in the fuel storage pool to fully test mast 70 before the refueling operation of a reactor is started.

While the invention has been described in terms of various specific embodiments, those skilled in the art will recognize that the invention can be practiced with modification within the spirit and scope of the claims.

What is claimed is:

1. A retaining tool for a telescoping refueling arm in a nuclear reactor, the refueling arm comprising an outer tube assembly, a plurality of intermediate tube assemblies, and an inner tube assembly, each of the outer tube assembly and the intermediate tube assemblies including at a bottom end, a flange and a plurality of roller housings spaced around the circumference of each flange, said retaining tool comprising:

a plurality of support members;

a first plate having a first and a second side, said first plate coupled to said support members;

a second plate coupled to said support members and spaced apart from said first plate, said second plate comprises an arcuate cut out configured to conform to the shape of the refueling arm intermediate tube assembly; and a third plate having a first and a second side, said third plate coupled to said support members and spaced apart from said second plate so that said second plate is located between said first and said third plates, said second side of said first plate configured to engage roller housings of the refueling arm outer tube assembly, said first side of said third plate configured to engage roller housings of an intermediate tube assembly.

2. A retaining tool in accordance with claim 1 wherein said first plate comprises an arcuate cut out configured to conform to the shape of an outer tube assembly.

3. A retaining tool in accordance with claim 2 wherein said second side of said first plate comprises a plurality of pockets configured to align with and conform to the shape of the roller housings of an outer tube assembly.

4. A retaining tool in accordance with claim 1 wherein said third plate comprises a cut out configured to permit said first surface of said third plate to engage roller housings of an intermediate tube assembly.

5. A retaining tool in accordance with claim 4 wherein said first surface of said third plate comprises a plurality of pockets configured to align with and conform to the shape of the roller housings of an intermediate tube assembly.

6. A retaining tool in accordance with claim 1 wherein at least one of said support members extends past said first surface of said first plate, said at least one support member comprising a handling pole adapter.

7. A telescoping refueling arm assembly for use in a nuclear reactor, the telescoping refueling arm comprising:

an outer tube assembly;

a plurality of intermediate tube assemblies;

an inner tube assembly, each of said outer tube assembly and said intermediate tube assemblies comprising, at a bottom end, a flange and a plurality of roller housings spaced around the circumference of each flange; and a retaining tool coupled to said outer tube assembly and at least one intermediate tube assembly, said retaining tool comprising:
- a plurality of support members;
- a first plate having a first and a second side, said first plate coupled to said support members;
- a second plate coupled to said support members and spaced apart from said first plate; and
- a third plate having a first and a second side, said third plate coupled to said support members and spaced apart from said second plate so that said second plate is located between said first and said third plates, said second side of said first plate engaging said roller housings of said refueling arm outer tube assembly, said first side of said third plate engaging said roller housings of an intermediate tube assembly.

8. A telescoping refueling arm assembly in accordance with claim 7 wherein said second plate comprises an arcuate cut out configured to conform to the shape of an intermediate tube assembly.

9. A telescoping refueling arm assembly in accordance with claim 7 wherein said first plate comprises an arcuate cut out conforming to the shape of said outer tube assembly.

10. A telescoping refueling arm assembly in accordance with claim 9 wherein said second side of said first plate comprises a plurality of pockets aligned with and conforming to the shape of said roller housings of said outer tube assembly.

11. A telescoping refueling arm assembly in accordance with claim 7 wherein said third plate comprises a cut out to permit said first surface of said third plate to engage said roller housings of an intermediate tube assembly.

12. A telescoping refueling arm assembly in accordance with claim 11 wherein said first surface of said third plate comprises a plurality of pockets aligned with and conforming to the shape of said roller housings of an intermediate tube assembly.

13. A telescoping refueling arm assembly in accordance with claim 7 wherein at least one of said support members extends past said first surface of said first plate, said at least one support member comprising a handling pole adapter.

* * * * *